US006213401B1

(12) United States Patent
Brown

(10) Patent No.: US 6,213,401 B1
(45) Date of Patent: Apr. 10, 2001

(54) SPEED LIMIT DETECTING SYSTEM

(76) Inventor: Michael Louis Brown, 9305 N. 149th East Ave., Owasso, OK (US) 74055

(*) Notice: Subject to any disclaimer, the term of this patent is extended or adjusted under 35 U.S.C. 154(b) by 0 days.

(21) Appl. No.: 09/195,829

(22) Filed: Nov. 19, 1998

(51) Int. Cl.[7] ........................... G06K 19/06; G06K 07/00
(52) U.S. Cl. ............................................ 235/486; 235/492
(58) Field of Search .................................... 235/462, 463, 235/471, 440, 494, 486; 358/93, 107

(56) References Cited

U.S. PATENT DOCUMENTS 5,483,453 * 1/1996 Uemura et al. ................. 364/424.02
5,682,030 * 10/1997 Bubon ................................. 235/462
5,819,198 * 10/1998 Peretz ................................. 701/117

* cited by examiner

*Primary Examiner*—Thien M. Le

(57) ABSTRACT

A speed limit detecting system for detecting and displaying to a driver the speed limit on the roadway the driver is travelling on. The system includes bar coding indicia is displayed on a road sign. The bar coding indicia graphically indicates predetermined information of the speed limit displayed on the road sign. A scanner is provided in a user's vehicle for scanning the bar coding indicia to obtain the predetermined information of the bar coding indicia. The scanner has a visual display for visually displaying the predetermined information of the bar coding indicia to the user.

1 Claim, 4 Drawing Sheets

SPEED LIMIT DETECTING SYSTEM

BACKGROUND OF THE INVENTION

1. Field of the Invention

The present invention relates to speed limit detecting systems and more particularly pertains to a new speed limit detecting system for detecting and displaying to a driver the speed limit on the roadway the driver is travelling on.

2. Description of the Prior Art

The use of speed limit detecting systems is known in the prior art. More specifically, speed limit detecting systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,484,992 (Inventors: Wiltz et al); 5,504,320 (Inventor: Adachi); 5,546,188 (Inventors: Wangler et al); 5,629,511 (Inventors: Iwaguchi et al); 5,550,363; and U.S. Pat. No. Design 384,651 (Inventors: Sandor et al), which are each incorporated herein by reference.

While these devices fulfill their respective, particular objectives and requirements, the aforementioned patents do not disclose a new speed limit detecting system. The inventive device includes bar coding indicia is displayed on a road sign. The bar coding indicia graphically indicates predetermined information of the speed limit displayed on the road sign. A scanner is provided in a user's vehicle for scanning the bar coding indicia to obtain the predetermined information of the bar coding indicia. The scanner has a visual display for visually displaying the predetermined information of the bar coding indicia to the user.

In these respects, the speed limit detecting system according to the present invention substantially departs from the conventional concepts and designs of the prior art, and in so doing provides an apparatus primarily developed for the purpose of detecting and displaying to a driver the speed limit on the roadway the driver is travelling on.

SUMMARY OF THE INVENTION

In view of the foregoing disadvantages inherent in the known types of speed limit detecting systems now present in the prior art, the present invention provides a new speed limit detecting system construction wherein the same can be utilized for detecting and displaying to a driver the speed limit on the roadway the driver is travelling on.

The general purpose of the present invention, which will be described subsequently in greater detail, is to provide a new speed limit detecting system apparatus and method which has many of the advantages of the speed limit detecting systems mentioned heretofore and many novel features that result in a new speed limit detecting system which is not anticipated, rendered obvious, suggested, or even implied by any of the prior art speed limit detecting systems, either alone or in any combination thereof.

To attain this, the present invention generally comprises bar coding indicia is displayed on a road sign. The bar coding indicia graphically indicates predetermined information of the speed limit displayed on the road sign. A scanner is provided in a user's vehicle for scanning the bar coding indicia to obtain the predetermined information of the bar coding indicia. The scanner has a visual display for visually displaying the predetermined information of the bar coding indicia to the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structure, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new speed limit detecting system apparatus and method which has many of the advantages of the speed limit detecting systems mentioned heretofore and many novel features that result in a new speed limit detecting system which is not anticipated, rendered obvious, suggested, or even implied by any of the prior art speed limit detecting systems, either alone or in any combination thereof.

It is another object of the present invention to provide a new speed limit detecting system which may be easily and efficiently manufactured and marketed.

It is a further object of the present invention to provide a new speed limit detecting system which is of a durable and reliable construction.

An even further object of the present invention is to provide a new speed limit detecting system which is susceptible of a low cost of manufacture with regard to both materials and labor, and which accordingly is then susceptible of low prices of sale to the consuming public, thereby making such speed limit detecting system economically available to the buying public.

Still yet another object of the present invention is to provide a new speed limit detecting system which provides in the apparatuses and methods of the prior art some of the advantages thereof, while simultaneously overcoming some of the disadvantages normally associated therewith.

Still another object of the present invention is to provide a new speed limit detecting system for detecting and displaying to a driver the new speed limit on the roadway the driver is travelling on.

Yet another object of the present invention is to provide a new speed limit detecting system which includes bar coding indicia is displayed on a road sign. The bar coding indicia graphically indicates predetermined information of the speed limit displayed on the road sign. A scanner is provided in a user's vehicle for scanning the bar coding indicia to obtain the predetermined information of the bar coding indicia. The scanner has a visual display for visually displaying the predetermined information of the bar coding indicia to the user.

Still yet another object of the present invention is to provide a new speed limit detecting system that helps drivers become aware about speed limit changes on a roadway to help a driver avoid speeding on roadways where the speed limit is reduced and because the driver did not see a speed limit sign for the roadway.

Even still another object of the present invention is to provide a new speed limit detecting system that may be used in pre-existing vehicles and also may be installed as an integral factory feature of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
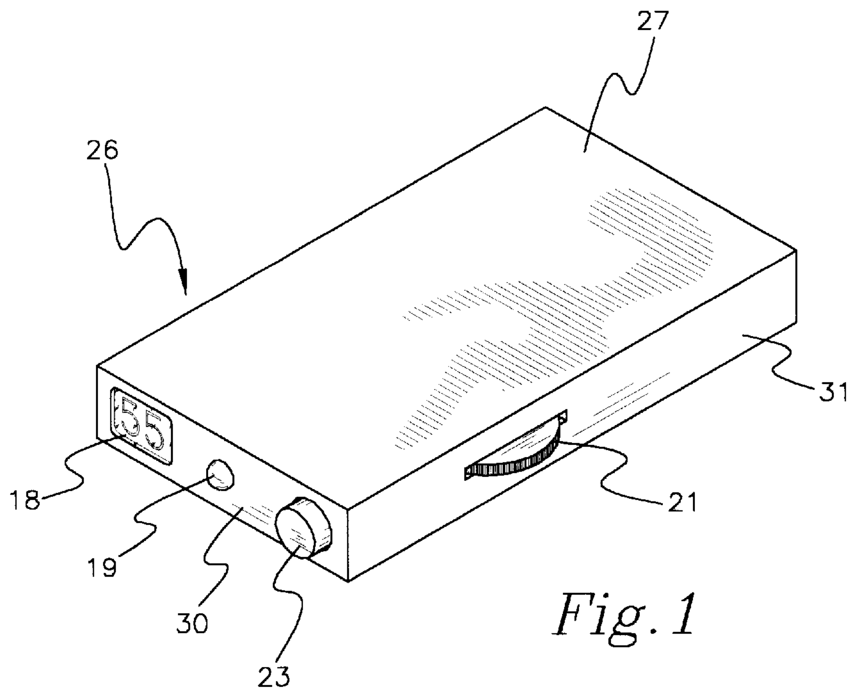
FIG. 1 is a schematic back perspective view of a new speed limit detecting system according to the present invention.
Figure 2:
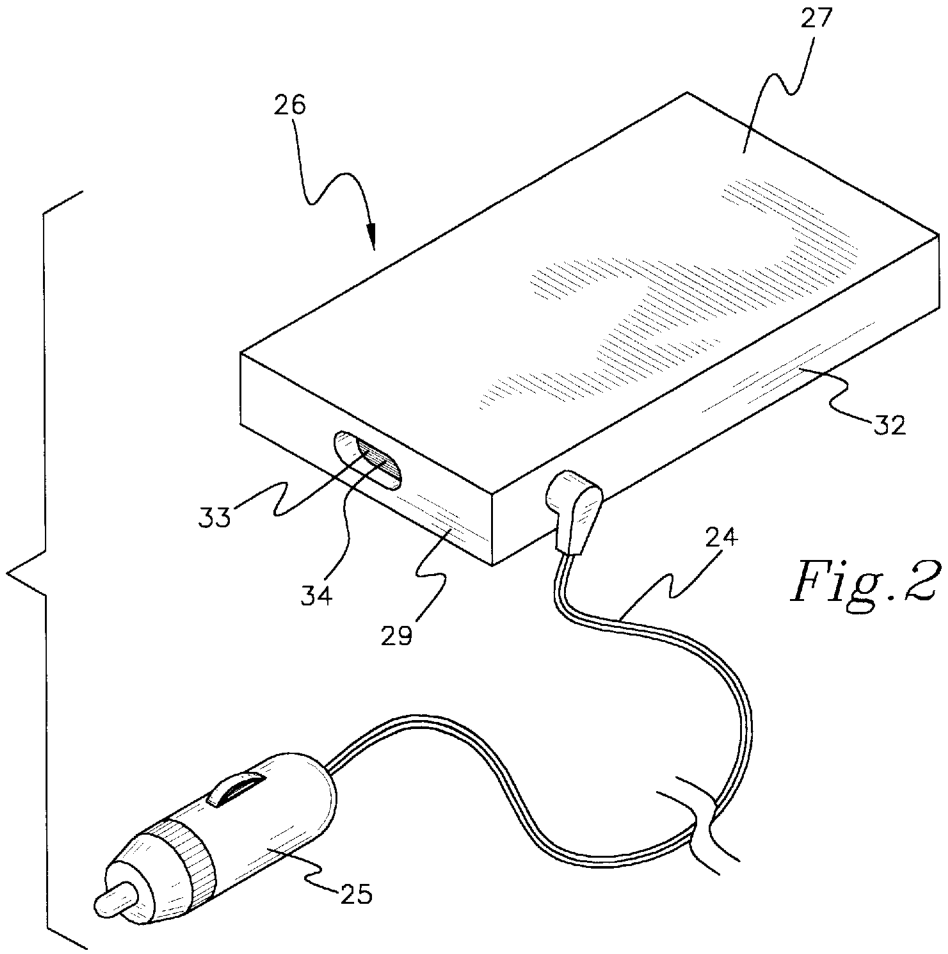
FIG. 2 is a schematic front perspective view of the present invention.

With reference now to the drawings, and in particular to FIGS. 1 through 7 thereof, a new speed limit detecting system embodying the principles and concepts of the present invention and generally designated by the reference numeral 10 will be described.

As best illustrated in FIGS. 1 through 7, the speed limit detecting system 10 generally comprises bar coding indicia 11 is displayed on a road sign 12. The bar coding indicia 11 graphically indicates predetermined information of the speed limit displayed on the road sign 12. A scanner 15 is provided in a user's vehicle for scanning the bar coding indicia 11 to obtain the predetermined information of the bar coding indicia 11. The scanner 15 has a visual display 18 for visually displaying the predetermined information of the bar coding indicia 11 to the user.

In use, the speed limit detecting system 10 is designed for detecting and displaying a speed limit of a roadway to a driver of a vehicle. In closer detail, the system comprises bar coding indicia 11 displayed on a road sign 12. The road sign preferably is a speed limit sign having alpha-numeric indicia 13 indicating a speed limit of the roadway. The road sign 12 may also include street signs, billboard, and other visual display 18 signs that display visual information to a driver. The bar coding indicia 11 graphically indicates predetermined information. The predetermined information corresponds to the speed limit of the roadway. Optionally, the predetermined indicia may also comprise other messages directed to the driver such as information of road obstacles and advertisements. The bar coding indicia 11 is preferably provided on a sticker 14 generally rectangular in configuration and having an adhesive provided thereon adhesively coupling the sticker 14 to the road sign 12.

A scanner 15 is provided in a user's vehicle designed for travel on the roadway. The scanner is designed for scanning the bar coding indicia 11 to obtain the predetermined information of the bar coding indicia 11. The scanner 15 has a transmitter 16 for transmitting a signal towards the bar coding indicia 11 and a receiver 40 for receiving a reflected signal of the transmitter 16 from the bar coding indicia 11 to transmit the information of the bar coding indicia 11 to the scanner 15. The scanner 15 has a visual display 18 for visually displaying the predetermined information of the bar coding indicia 11 to a user. In use, the visual display 18 displays the speed limit displayed on the road sign 12. The scanner 15 also preferably has a light source 19 for providing a visible indicator to the user when the scanner 15 scans a new bar code indicia from a road sign 12. In use, the light source 19 preferably activates to provide light therefrom when the scanner 15 scans bar code indicia on a road sign 12. This way a driver is alerted to a new speed limit sign at will check the speed limit displayed on the visual display 18. The scanner 15 further preferably includes an audio speaker 20 for projecting an audible alert to the user when the scanner 15 scans bar code indicia on a road sign. The audio speaker 20 has a volume control 21 dial for permitting the user to selectively control the volume of the audible alert of the audio speaker 20.

The scanner 15 has a power switch 22 for selectively activating and deactivating the scanner 15. The power switch 22 has a push-button actuator 23 designed for depressing by a user to open and close the power switch 22. The scanner 15 is electrically connectable to a power source of the vehicle. Ideally, the scanner 15 has a power cord 24 for electrically connecting the scanner 15 to the power source of the vehicle. The power cord 24 preferably has a plug 25 designed for insertion into a car electrical socket electrically connected to the power source of the vehicle.

Preferably, the scanner 15 is provided in a housing 26 having a generally rectangular configuration. The housing 26 has top and bottom faces 27,28, front and back ends 29,30, and a pair of sides 31,32 extending between the front and back ends 29,30 of the housing 26. The housing 26 has a thickness defined between the top and bottom faces 27,28 of the housing 26, a length defined between the front and back ends 29,30 of the housing 26, and a width defined between the sides 31,32 of the housing 26. Preferably, the length of the housing 26 is at least about two times greater than the width of the housing 26, the width of the housing 26 is at least about four times greater than the thickness of the housing 26 to provide a preferred size for use in a passenger compartment of a vehicle. In an ideal illustrative embodiment, the thickness of the housing 26 is about ½ inch, the length of the housing 26 is about 4 inches, and the width of the housing 26 is about 2 inches to provide an ideal size for resting on the dash or display console of a vehicle.

The transmitter 16 has an emitter 33 for emitting the signal and the receiver 40 has a detector 34 17 for detecting the reflected signal. The emitter 33 and detector 34 17 are located on the front end 29 of the housing 26. The front end 29 of the housing 26 is designed for positioning in a direction towards a front end 29 of the vehicle. The visual display 18, the light source 19, and the actuator 23 of the power switch 22 are located on the back end 30 of the housing 26. In use, the back end 30 of the housing 26 is designed for positioning in a direction towards a rear end of the vehicle. The volume control 21 is preferably located on one of the sides 31 of the housing 26 while the power cord 24 is extended from another side 32 of the housing 26.

Figure 3:
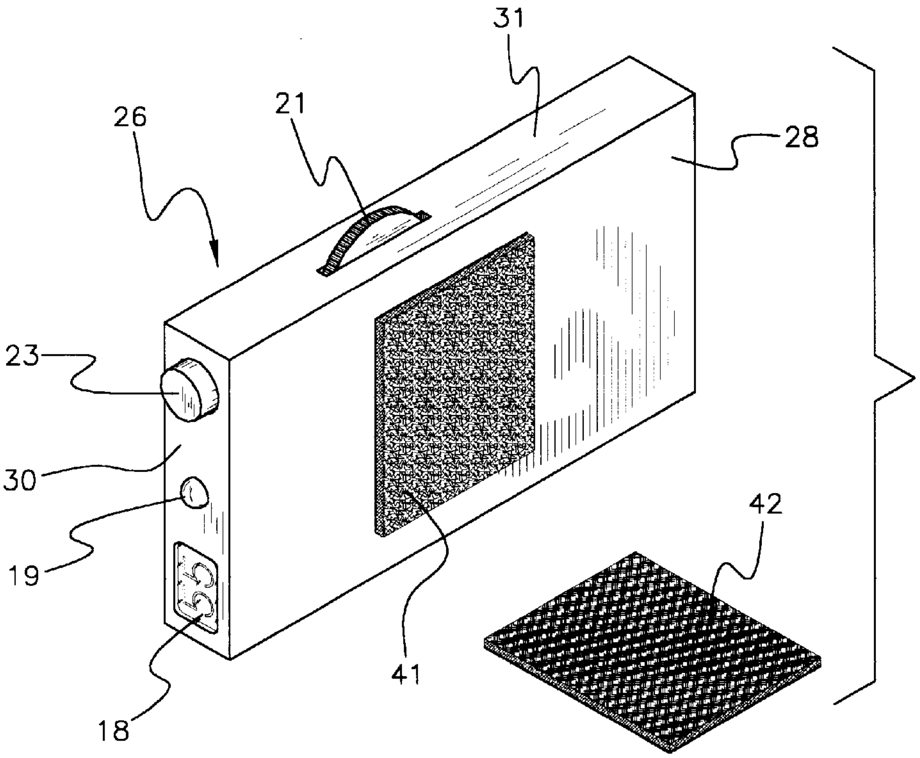
FIG. 3 is a schematic perspective view of the bottom face of the housing of the scanner of the present invention.
Figure 4:
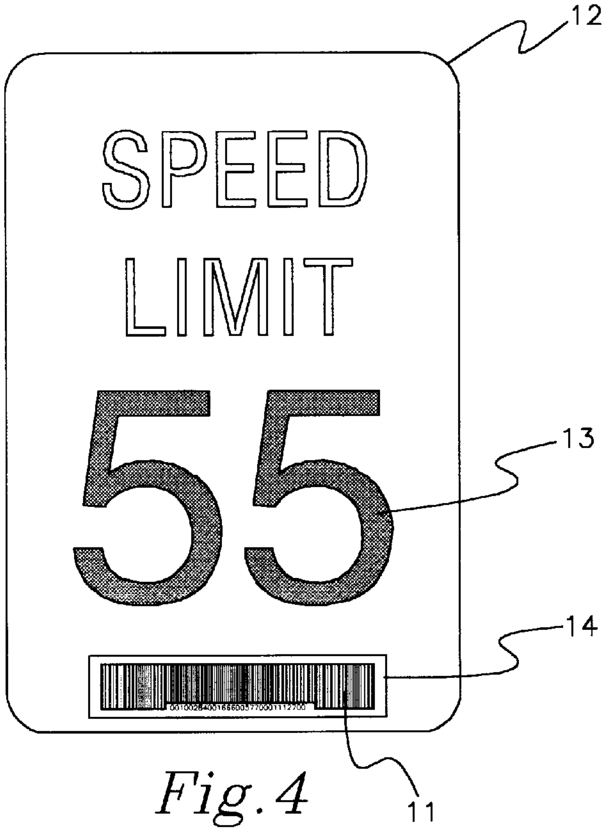
FIG. 4 is a schematic side view of a road sign of the present invention.
Figure 5:
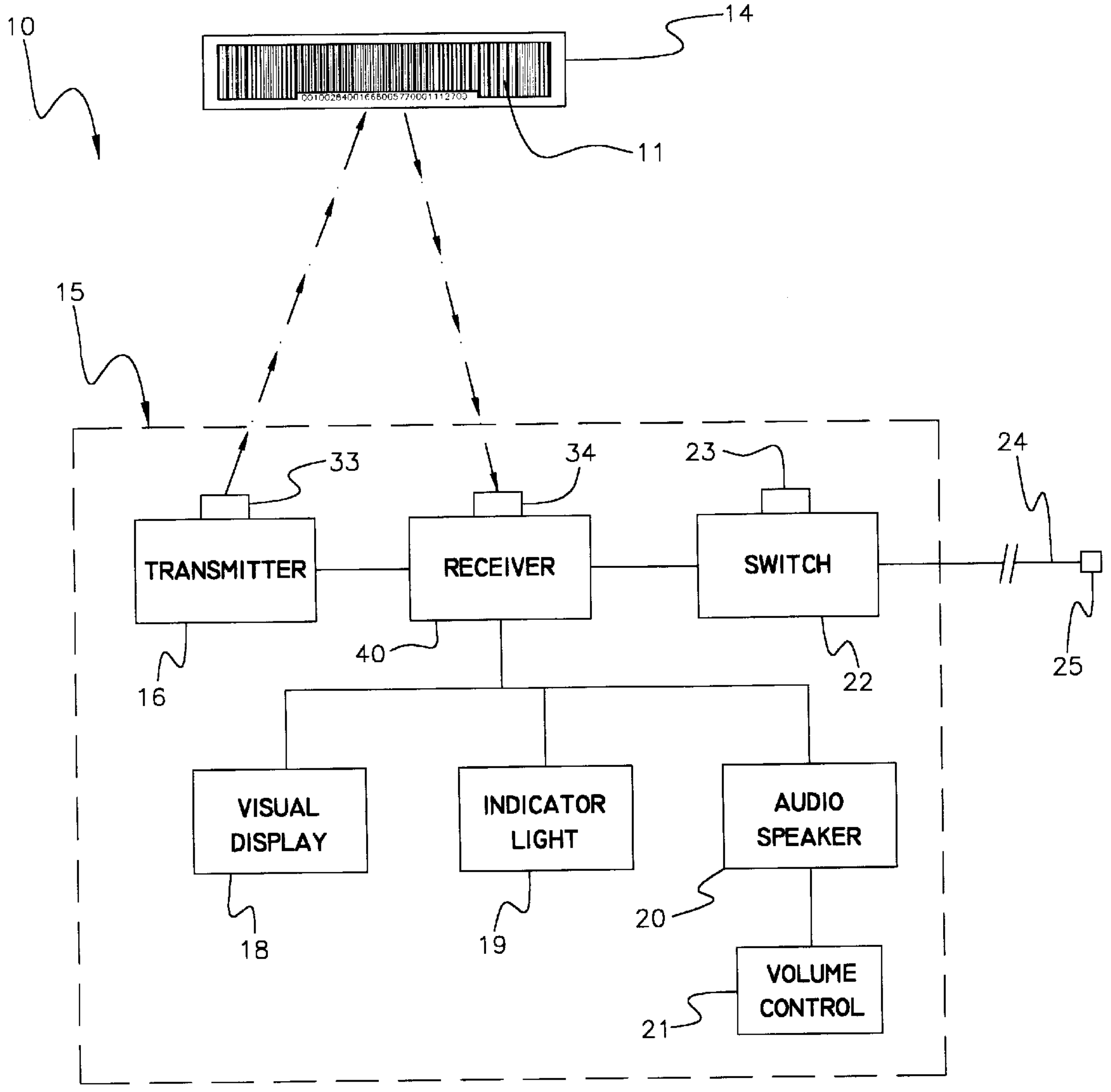
FIG. 5 is a schematic electrically diagram of the scanner of the present invention.
Figure 6:
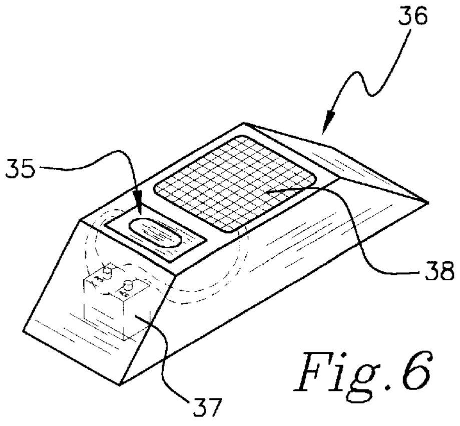
FIG. 6 is a schematic perspective view of the radio transmitter additional embodiment of the present invention.
Figure 7:
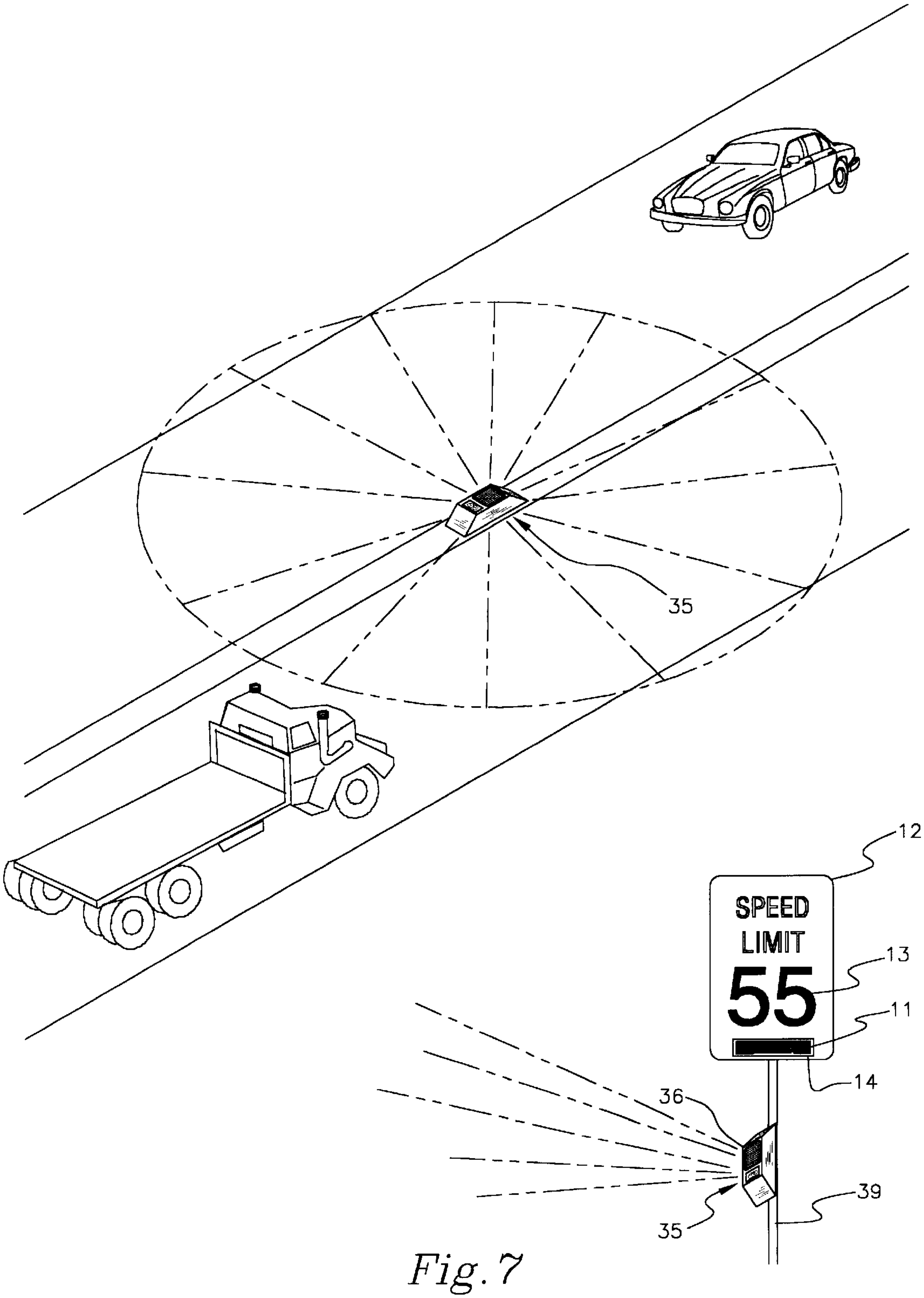
FIG. 7 is a schematic plan view of the additional embodiment of the present invention in use on a roadway.

The bottom face 28 of the housing 26 is designed for attachment to a surface in a passenger compartment of the vehicle. As illustrated in FIG. 3, the bottom face 28 of the housing 26 preferably has a portion 41 of a hooks and loops fastener provided thereon designed for coupling to a complementary portion 42 of the hooks and loops fastener provided on the surface of the passenger compartment.

In use, as a user drives a vehicle with the scanner provided therein on a roadway, the scanner detects bar coding indicia on the passing speed limit signs which contain information indicating the speed limit of the roadway (and displayed on the sign). The scanner then displays the speed limit on the visual display and illuminates the light source and emits an alarm from the speaker to alert the driver of the speed limit of the roadway.

As a back up system, a radio transmitter 35 for transmitting a radio signal containing predetermined information may be provided with the system. The transmitter 35 comprises a low frequency radio frequency identification transmitter. The radio transmitter 35 is provided in a housing 36. A battery power source 37 is also provided in the housing 36 and is electrically connected to the radio transmitter 35. The housing 36 has a plurality of photo-voltaic cells 38 provided thereon which are electrically connected to the battery power source 37 for recharging the battery power source 37 from energy from sunlight. In use, this housing 36 is designed for mounting to a support structure such as a post 39 supporting a roadside. In this additional embodiment, the scanner has a radio detector for detecting the radio signal transmitted by the radio transmitter 35. The detector is electrically connected to the visual display for displaying the predetermined information of the radio signal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A speed limit detecting system for detecting and displaying a speed limit of a roadway to a driver of a vehicle, said system comprising:

bar coding indicia being displayed on a road sign, said road sign having alpha-numeric indicia indicating a speed limit;

said bar coding indicia graphically indicating predetermined information, said predetermined information comprising the speed limit of said roadway;

said bar coding indicia being provided on a sticker being generally rectangular in configuration and having an adhesive provided thereon adhesively coupling said sticker to said road sign;

a scanner for scanning said bar coding indicia to obtain said predetermined information of said bar coding indicia, said scanner being provided in a vehicle;

said scanner having a transmitter for transmitting a signal towards said bar coding indicia and a receiver for receiving a reflected signal from said bar coding indicia to transmit said information of said bar coding indicia to said scanner;

said scanner having a visual display for visually displaying the predetermined information of the bar coding indicia to a user, wherein said visual display displays the speed limit displayed on the road sign;

said scanner having a light source for providing a visible indicator to the user when said scanner scans bar code indicia from a road sign, said light source activating to provide light therefrom when said scanner scans bar code indicia on a road sign such that the user is alerted that another road sign and has been scanned by said scanner and that said predetermined information from another road sign is compared to said information on said visual display;

said scanner having an audio speaker for projecting an audible alert to the user when said scanner scans bar code indicia on a road sign;

said audio speaker having a volume control for permitting the user to selectively control the volume of the audible alert of the audio speaker;

said scanner having a power switch for selectively activating and deactivating said scanner, said power switch having a push-button actuator adapted for depression by a user to activate said power switch;

said scanner being electrically connectable to a power source of the vehicle, wherein said scanner has a power cord for electrically connecting said scanner to the power source of the vehicle, said power cord having a plug adapted for insertion into a car electrical socket electrically connected to the power source of the vehicle;

said scanner being provided in a housing having a generally rectangular configuration, said housing having top and bottom faces, front and back ends, and a pair of sides extending between said front and back ends of said housing;

said housing having a thickness defined between said top and bottom faces of said housing, a length defined between said front and back ends of said housing, and a width defined between said sides of said housing;

said transmitter having an emitter for emitting said signal and said receiver having a detector for detecting said reflected signal;

said emitter and detector being located on said front end of said housing, said front end of said housing being adapted for positioning in a direction towards a front end of the vehicle;

said visual display, said light source, and said actuator of said power switch being located on said back end of said housing, said back end of said housing being for positioning in a direction towards a rear end of the vehicle;

said volume control being located on one of said sides of said housing, said power cord being extended from another side of said housing; and said bottom face of said housing being adapted for attachment to a surface in a passenger compartment of the vehicle, wherein said bottom face of said housing has a portion of a hooks and loops fastener provided thereon adapted for coupling to a complementary portion of the hooks and loops fastener provided on the surface of the passenger compartment;

a radio transmitter for transmitting a radio signal containing predetermined information, said transmitter comprising a low frequency radio frequency identification transmitter, said radio transmitter being provided in a housing, a battery power source being provided in said housing and being electrically connected to said radio transmitter, said housing having a plurality of photo-voltaic cells provided thereon, said photo-voltaic cells being electronically connected to said battery power source for recharging said battery source from energy from sunlight;

said housing being adapted for mounting to a support structure of the road sign; and said scanner having a radio detector for detecting said radio signal transmitted by said radio transmitter, said detector being electrically connected to said visual display for displaying said predetermined information of said radio signal.

* * * * *